(12) United States Patent
Yang

(10) Patent No.: US 10,216,374 B2
(45) Date of Patent: Feb. 26, 2019

(54) METHOD AND APPARATUS FOR DISPLAYING NOTIFICATION MESSAGE

(71) Applicant: Huawei Technologies Co., Ltd., Shenzhen (CN)

(72) Inventor: Fen Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 535 days.

(21) Appl. No.: 14/566,878

(22) Filed: Dec. 11, 2014

(65) Prior Publication Data

US 2015/0169159 A1 Jun. 18, 2015

Related U.S. Application Data

(63) Continuation of application No. PCT/CN2014/083790, filed on Aug. 6, 2014.

(30) Foreign Application Priority Data

Aug. 26, 2013 (CN) .......................... 2013 1 0375715

(51) Int. Cl.
*G06F 3/048* (2013.01)
*G06F 3/00* (2006.01)
(Continued)

(52) U.S. Cl.
CPC .......... *G06F 3/0484* (2013.01); *G06F 3/0488* (2013.01); *G06F 3/04817* (2013.01);
(Continued)

(58) Field of Classification Search
CPC ......... H04W 68/00; H04W 4/00; G06F 3/048; G06F 3/00
See application file for complete search history.

(56) References Cited

U.S. PATENT DOCUMENTS 8,473,871 B1 * 6/2013 Sandler ................. G06F 3/0481
345/173
2001/0035881 A1 * 11/2001 Stoakley ............. G06F 3/04817
715/772
(Continued)

FOREIGN PATENT DOCUMENTS

| CN | 101188827 A | 5/2008 |
| CN | 101437310 A | 5/2009 |

(Continued)

OTHER PUBLICATIONS

Falling Icons, Jun. 18, 2012, YouTube Video, pp. 1-2.*
(Continued)

*Primary Examiner* — Hugo Molina
(74) *Attorney, Agent, or Firm* — Conley Rose, P.C.

(57) ABSTRACT

A method and an apparatus for displaying a notification message. The method includes receiving a first notification message, parsing the first notification message to obtain a message type of the first notification message or an application server identifier of the first notification message, acquiring, according to the message type of the first notification message or the application server identifier of the first notification message, a moving track used to dynamically display the first notification message and an icon used to dynamically display the first notification message, and dynamically displaying the first notification message according to the icon and the moving track. By using the method and the apparatus for displaying a notification message, a user can conveniently learn a real-time notification message in a timely manner, thereby improving service quality for the user.

14 Claims, 7 Drawing Sheets

(51) Int. Cl.
*G06F 3/0484* (2013.01)
*H04L 12/18* (2006.01)
*H04L 12/58* (2006.01)
*G06F 3/0481* (2013.01)
*G06F 3/0488* (2013.01)
*H04L 29/08* (2006.01)

(52) U.S. Cl.
CPC .......... *H04L 12/1859* (2013.01); *H04L 51/18* (2013.01); *H04L 67/26* (2013.01)

(56) References Cited

U.S. PATENT DOCUMENTS

| | | |
|---|---|---|
| 2002/0019243 A1 | 2/2002 | Zhang et al. |
| 2004/0098462 A1 | 5/2004 | Horvitz et al. |
| 2005/0268237 A1 | 12/2005 | Crane et al. |
| 2007/0190991 A1* | 8/2007 | Cargille ................ H04M 19/04 455/415 |
| 2008/0262870 A1* | 10/2008 | Jones .................. G06F 19/3406 705/2 |
| 2009/0172103 A1* | 7/2009 | Tuli ....................... G06Q 10/10 709/206 |
| 2009/0201270 A1* | 8/2009 | Pikkujamsa .......... G06F 1/1626 345/184 |
| 2010/0146437 A1* | 6/2010 | Woodcock ............. G06Q 30/06 715/806 |
| 2010/0162300 A1* | 6/2010 | Velazquez ............ G08B 27/008 725/33 |
| 2012/0054683 A1* | 3/2012 | Sands ............... H04M 1/72583 715/825 |
| 2012/0150970 A1 | 6/2012 | Peterson et al. |
| 2012/0223890 A1* | 9/2012 | Borovsky ........... G06F 3/04883 345/173 |
| 2012/0229276 A1* | 9/2012 | Ronkainen ............. G08B 7/06 340/540 |
| 2013/0007665 A1* | 1/2013 | Chaudhri ............. G06F 9/4443 715/830 |
| 2013/0139109 A1* | 5/2013 | Kim .................... G06F 3/04883 715/835 |
| 2013/0150088 A1* | 6/2013 | Nasir .................... H04W 4/001 455/456.3 |
| 2013/0244633 A1* | 9/2013 | Jacobs ................. H04W 68/00 455/415 |
| 2014/0043365 A1* | 2/2014 | Fialho .................... G06T 15/20 345/633 |
| 2014/0089848 A1* | 3/2014 | Smith .................. H04L 67/147 715/808 |
| 2014/0108995 A1* | 4/2014 | Sandler ............... G06F 3/04883 715/781 |
| 2014/0189533 A1* | 7/2014 | Krack ................... G06F 3/0481 715/753 |
| 2014/0317522 A1* | 10/2014 | Lucero ..................... G06F 3/01 715/744 |

FOREIGN PATENT DOCUMENTS

| | | |
|---|---|---|
| CN | 101697560 A | 4/2010 |
| CN | 101815101 A | 8/2010 |
| CN | 101950236 A | 1/2011 |
| CN | 102130999 A | 7/2011 |
| CN | 103051516 A | 4/2013 |
| CN | 103634199 A | 3/2014 |
| KR | 20020004587 A | 1/2002 |

OTHER PUBLICATIONS

Partial English Translation and Abstract of Chinese Patent Application No. CN1014377310A, Jan. 9, 2015, 4 pages.
Partial English Translation and Abstract of Chinese Patent Application No. CN103634199A, Part 1, Jan. 9, 2015, 8 pages.
Partial English Translation and Abstract of Chinese Patent Application No. CN103634199A, Part 2, Jan. 9, 2015, 3 pages.
Partial English Translation and Abstract of Korean Patent Application No. KR2002-0004587A, Part 1, Jan. 9, 2015, 3 pages.
Partial English Translation and Abstract of Korean Patent Application No. KR2002-0004587A, Part 2, Jan. 9, 2015, 2 pages.
Foreign Communication From A Counterpart Application, PCT Application No. PCT/CN2014/083790, International Search Report dated Nov. 18, 2014, 2 pages.
Foreign Communication From A Counterpart Application, PCT Application No. PCT/CN20141083790, Written Opinion dated Nov. 18, 2014, 6 pages.
Foreign Communication From A Counterpart Application, European Application No. 14808475.9, Extended European Search Report dated Jul. 3, 2015, 7 pages.
Partial English Translation and Abstract of Chinese Patent Application No. CN101697560, Dec. 21, 2016, 14 pages.
Foreign Communication From A Counterpart Application, Chinese Application No. 201310375715.0, Chinese Office Action dated Nov. 23, 2016, 9 pages.
Partial English Translation and Abstract of Chinese Patent Application No. CN102130999, Apr. 4, 2016, 11 pages.
Foreign Communication From A Counterpart Application, Chinese Application No. 201310375715.0, Chinese Office Action dated Mar. 9, 2016, 8 pages.

\* cited by examiner

| Notification message type | Icon |
|---|---|
| Promotional information |  |
| Questionnaire |  |
| System upgrade |  |

| Merchant/application | Icon |
|---|---|
| McDonald's |  |
| KFC |  |
| Traffic Rule Violation Check |  |

| Identifier | Icon |
|---|---|
| 001 |  |
| 002 |  |
| 003 |  |
| 004 |  |

METHOD AND APPARATUS FOR DISPLAYING NOTIFICATION MESSAGE

CROSS-REFERENCE TO RELATED APPLICATIONS

This application is a continuation of International Application No. PCT/CN2014/083790, filed on Aug. 6, 2014, which claims priority to Chinese Patent Application No. 201310375715.0, filed on Aug. 26, 2013, both of which are hereby incorporated by reference in their entireties.

TECHNICAL FIELD

Embodiments of the present disclosure relate to the field of communications technologies, and in particular, to a method and an apparatus for displaying a notification message.

BACKGROUND

A Push technology is a technology based on a client/server mechanism, in which a server actively sends information to a client. Both an Android® system and an iOS system support the Push technology. When a system used by a terminal is the Android® system, the terminal generally displays a Push message in a manner of dropping down a notification bar, where a user needs to acquire a notification message by manually dropping down the notification bar, and some unhandled messages (such as unhandled calls) are also included in the notification bar. When a system used by a terminal is the iOS system, types of an Apple terminal Push mechanism include: a badge, a sound, a banner, and an alert, where the badge means marking a quantity of messages pushed by an application by using a number in the upper right part of an application icon, and a user can view the push messages only after entering the application. The sound means playing a sound when a notification message is received, and the sound does not play a big role when the terminal is in a silent mode or in a noisy place. The banner is similar to a drop-down notification bar in the Android® system. The terminal may display a notification message in a fade-in fade-out manner within a short time after receiving the notification message, and the user needs to manually drop down the notification bar to view the message after the short time expires. The alert means popping up a dialog box alert on a terminal interface, while this manner may block a screen, and a current usage intention of the user is easily to be interrupted if an alert box pops up at a key moment when the user operates the terminal.

In methods for displaying a notification message in the two foregoing systems, the user needs to drop down the notification bar and look for related information, or the terminal screen is occupied or blocked, and a problem that the user cannot conveniently learn a real-time notification message in a timely manner exists in the above methods.

SUMMARY

Embodiments of the present disclosure provide a method and an apparatus for displaying a notification message, so that a user can conveniently learn a real-time notification message in a timely manner, thereby improving service quality for the user.

According to a first aspect, an embodiment of the present disclosure provides a method for displaying a notification message, including receiving a first notification message; parsing the first notification message to obtain a message type of the first notification message or an application server identifier of the first notification message, acquiring, according to the message type of the first notification message or the application server identifier of the first notification message, a moving track used to dynamically display the first notification message and an icon used to dynamically display the first notification message, and dynamically displaying the first notification message according to the icon and the moving track.

In a first possible implementation manner of the first aspect, before the dynamically displaying the first notification message according to the icon and the moving track, the method further includes receiving an operation instruction of a user, and the dynamically displaying the first notification message according to the icon and the moving track includes, when the operation instruction of the user meets a condition of dynamically displaying the first notification message, dynamically displaying the first notification message according to the icon and the moving track.

With reference to the first aspect or the first possible implementation manner of the first aspect, in a second possible implementation manner of the first aspect, before the receiving a first notification message, the method further includes receiving an instruction, which is sent by the user, to enable a notification message dynamic display function, and enabling the dynamic display function.

With reference to the first aspect or the first possible implementation manner of the first aspect, in a third possible implementation manner of the first aspect, before the acquiring, according to the message type of the first notification message or the application server identifier of the first notification message, a moving track used to dynamically display the first notification message and an icon used to dynamically display the first notification message, the method further includes determining, according to the message type of the first notification message, that the first notification message needs to be dynamically displayed.

With reference to the third possible implementation manner of the first aspect, in a fourth possible implementation manner of the first aspect, the determining, according to the message type of the first notification message, that the first notification message needs to be dynamically displayed includes, if the first notification message carries a dynamic display identifier, determining, according to the dynamic display identifier, that the first notification message needs to be dynamically displayed, or determining, according to the message type of the first notification message and a prestored message type of a notification message that needs to be dynamically displayed, that the first notification message needs to be dynamically displayed, or comparing the message type of the first notification message with a dynamically displayed notification message type list that is selected by the user, and determining that the first notification message needs to be dynamically displayed, where the dynamically displayed notification message type list is provided by a terminal for the user to select.

With reference to the method of any one of the first aspect to the fourth possible implementation manner of the first aspect, in a fifth possible implementation manner of the first aspect, the acquiring, according to the message type of the first notification message or the application server identifier of the first notification message, a moving track used to dynamically display the first notification message includes acquiring, according to the message type of the first notification message and a prestored correspondence between a notification message type and a moving track, the moving track used to dynamically display the first notification message, or acquiring, according to the application server identifier of the first notification message and a prestored correspondence between an application server and a moving track, the moving track used to dynamically display the first notification message, or if the first notification message carries an identifier of the moving track, obtaining, according to the identifier of the moving track, the moving track used to dynamically display the first notification message, or before the receiving a first notification message that is sent by a server, setting moving tracks used to dynamically display notification messages with different message types, or setting moving tracks used to dynamically display notification messages that are sent by different application servers, and the acquiring, according to the message type of the first notification message or the application server identifier of the first notification message, an icon used to dynamically display the first notification message includes acquiring, according to the message type of the first notification message and a prestored correspondence between a notification message type and an icon, the icon used to dynamically display the first notification message; or acquiring, according to the application server identifier of the first notification message and a prestored correspondence between an application server and an icon, the icon used to dynamically display the first notification message, or if the first notification message carries an identifier of the icon, obtaining, according to the identifier of the icon, the icon used to dynamically display the first notification message, or before the receiving a first notification message, setting icons used to dynamically display notification messages with different message types, or setting icons used to dynamically display notification messages that are sent by different application servers.

According to a second aspect, an embodiment of the present disclosure provides an apparatus for displaying a notification message, including a receiving module configured to receive a first notification message, a parsing module configured to parse the first notification message to obtain a message type of the first notification message or an application server identifier of the first notification message, an acquiring module configured to acquire, according to the message type of the first notification message or the application server identifier of the first notification message, a moving track used to dynamically display the first notification message and an icon used to dynamically display the first notification message, and a display module configured to dynamically display the first notification message according to the icon and the moving track.

In a first possible implementation manner of the second aspect, the receiving module is further configured to receive an operation instruction of a user; and the display module is configured to, when the operation instruction of the user meets a condition of dynamically displaying the first notification message, dynamically display the first notification message according to the icon and the moving track.

With reference to the second aspect or the first possible implementation manner of the second aspect, in a second possible implementation manner of the second aspect, the receiving module is further configured to, before receiving the first notification message, receive an instruction, which is sent by the user, of enabling a notification message dynamic display function, and the apparatus further includes a processing module configured to enable the dynamic display function.

With reference to the second aspect or the first possible implementation manner of the second aspect, in a third possible implementation manner of the second aspect, the apparatus further includes a determining module, configured to, before the acquiring module acquires, according to the message type of the first notification message or the application server identifier of the first notification message, the moving track used to dynamically display the first notification message and the icon used to dynamically display the first notification message, determine, according to the message type of the first notification message, that the first notification message needs to be dynamically displayed.

With reference to the third possible implementation manner of the second aspect, in a fourth possible implementation manner of the second aspect, the determining module is further configured to, if the first notification message carries a dynamic display identifier, determine, according to the dynamic display identifier, that the first notification message needs to be dynamically displayed, or determine, according to the message type of the first notification message and a prestored message type of a notification message that needs to be dynamically displayed, that the first notification message needs to be dynamically displayed, or compare the message type of the first notification message with a dynamically displayed notification message type list that is selected by the user, and determine that the first notification message needs to be dynamically displayed, where the dynamically displayed notification message type list is provided by a terminal for the user to select.

With reference to the apparatus of any one of the second aspect to the fourth possible implementation manner of the second aspect, in a fifth possible implementation manner of the second aspect, the acquiring module is further configured to acquire, according to the message type of the first notification message and a prestored correspondence between a notification message type and a moving track, the moving track used to dynamically display the first notification message, or acquire, according to the application server identifier of the first notification message and a prestored correspondence between an application server and a moving track, the moving track used to dynamically display the first notification message, or if the first notification message carries an identifier of the moving track, obtain, according to the identifier of the moving track, the moving track used to dynamically display the first notification message, or before the receiving a first notification message that is sent by a server, set moving tracks used to dynamically display notification messages with different message types, or set moving tracks used to dynamically display notification messages that are sent by different application servers, and the acquiring module is further configured to acquire, according to the message type of the first notification message and a prestored correspondence between a notification message type and an icon, the icon used to dynamically display the first notification message, or acquire, according to the application server identifier of the first notification message and a prestored correspondence between an application server and an icon, the icon used to dynamically display the first notification message, or if the first notification message carries an identifier of the icon, obtain, according to the identifier of the icon, the icon used to dynamically display the first notification message, or before the receiving a first notification message, set icons used to dynamically display notification messages with different message types, or set icons used to dynamically display notification messages that are sent by different application servers.

In the method and the apparatus for displaying a notification message provided by the embodiments of the present disclosure, a terminal receives a first notification message, parses the first notification message to obtain a message type of the first notification message or an application server identifier of the first notification message; acquires, according to the message type of the first notification message or the application server identifier of the first notification message, a moving track and an icon used to dynamically display the first notification message, receives an operation instruction of a user, and when the operation instruction of the user meets a condition of dynamically displaying the first notification message, dynamically displays the first notification message according to the icon and the moving track. Attention of the user can be caught observably, the user is prompted to actively tap the icon to acquire content of the notification message, and the content of the notification message may not be displayed if the icon is not tapped. A position is not occupied and a screen is not blocked in a proper manner, and different tracks and different icons may be selected in different scenarios, to implement different dynamic display processes. Therefore, the user can conveniently learn a real-time notification message in a timely manner, thereby improving service quality for the user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

A method for displaying a notification message according to the embodiments of the present disclosure is applicable to a terminal device, such as a mobile phone, a smartphone, a tablet computer, an intelligent device, and a terminal device that implements an equivalent function.

Figure 1:
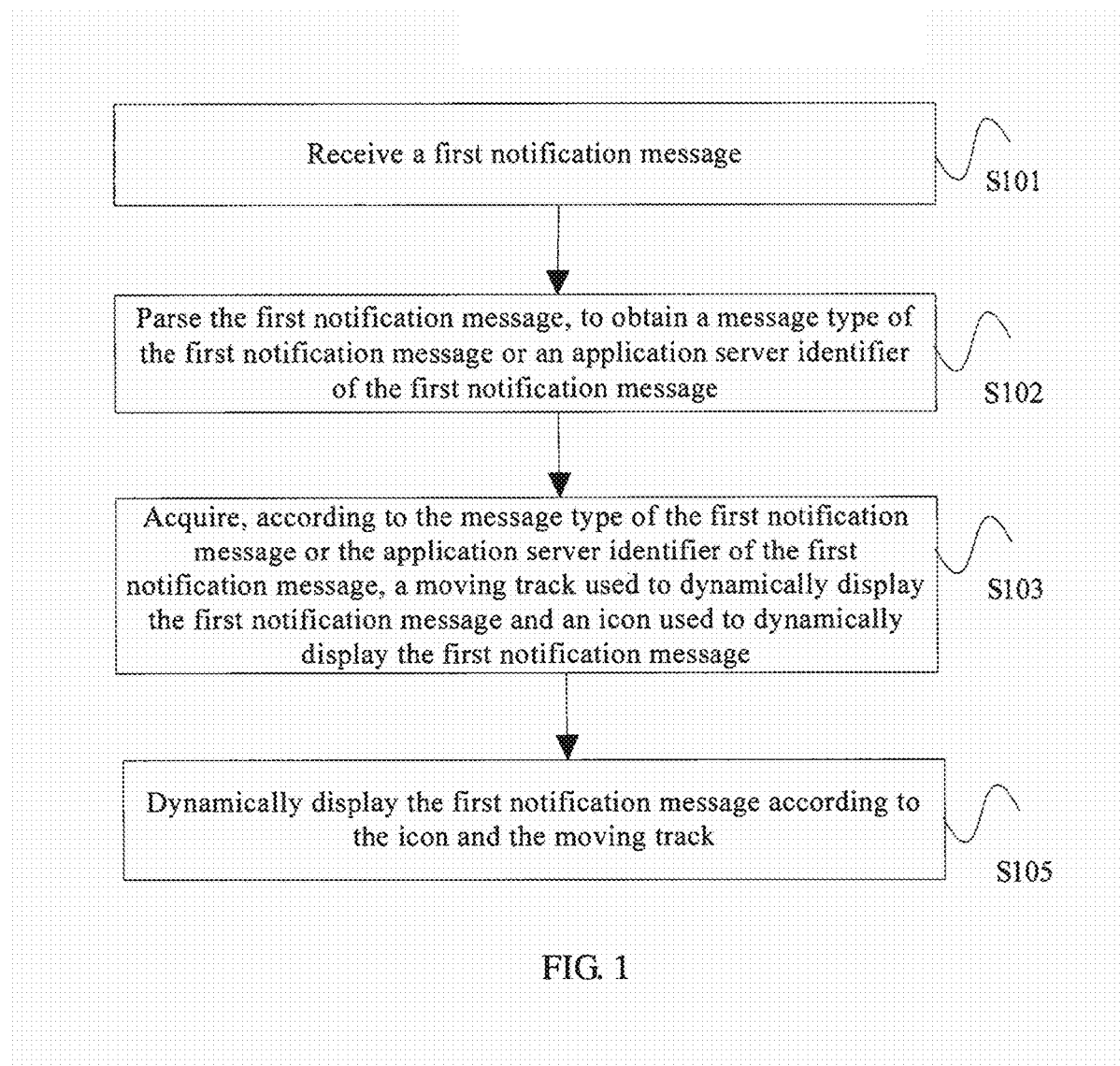
FIG. 1 is a flowchart of Embodiment 1 of a method for displaying a notification message according to the present disclosure.

Referring to FIG. 1, FIG. 1 is a flowchart of Embodiment 1 of a method for displaying a notification message according to the present disclosure. The method in this embodiment may include the following.

S101: Receive a first notification message.

The first notification message is pushed by a third party application or merchant to a terminal by using a Push server, and so the terminal receives the first notification message.

S102: Parse the first notification message to obtain a message type of the first notification message or an application server identifier of the first notification message.

After receiving the first notification message, the terminal parses the first notification message, so as to obtain the message type of the first notification message or the application server identifier of the first notification message. In this embodiment of the present disclosure, the message type may be, for example, system upgrade, a real-time message, a questionnaire, or promotional information.

S103: Acquire, according to the message type of the first notification message or the application server identifier of the first notification message, a moving track used to dynamically display the first notification message and an icon used to dynamically display the first notification message.

When the first notification message needs to be dynamically displayed, the terminal acquires, according to the message type of the first notification message or the application server identifier of the first notification message, the moving track and the icon used to dynamically display the first notification message.

Regarding notification messages that need to be dynamically displayed, as an implementable manner, all notification messages are dynamically displayed. In this manner, it is unnecessary for a client and a server to filter message types. The terminal may set a switch for dynamically displaying notification messages. If all the notification messages are dynamically displayed, before the terminal receives the first notification message, the method further includes receiving an instruction, which is sent by a user, of enabling a notification message dynamic display function, and enabling the dynamic display function. If the terminal does not enable the switch for dynamically displaying notification messages, all the notification messages are statically displayed.

As another implementable manner, before the terminal acquires, according to the message type of the first notification message or the application server identifier of the first notification message, the moving track used to dynamically display the first notification message and the icon used to dynamically display the first notification message, the method further includes the following.

S105: Determine, according to the message type of the first notification message, that the first notification message needs to be dynamically displayed.

In this embodiment of the present disclosure, a method for determining that the first notification message needs to be dynamically displayed may be implemented in the following three manners.

Manner 1: if the first notification message carries a dynamic display identifier, it is determined, according to the dynamic display identifier, that the first notification message needs to be dynamically displayed.

For example, the manner may be that, a Push server interface carries the message type and the dynamic display identifier of the first notification message, for example, a dynamic display identifier "1" indicates that the notification message is dynamically displayed, and when receiving the first notification message, the terminal parses the first notification message to obtain the message type and the dynamic display identifier, and may determine, according to the dynamic display identifier, that the first notification message needs to be dynamically displayed.

Manner 2: it is determined, according to the message type of the first notification message and a prestored message type of a notification message that needs to be dynamically displayed, that the first notification message needs to be dynamically displayed.

For example, the manner may be that, a Push server interface carries the message type of the first notification message, or carries an identifier of the message type of the first notification message, for example, "001" refers to promotional information, and "002" refers to a questionnaire. The terminal prestores a message type of a notification message that needs to be dynamically displayed. In this case, when receiving the first notification message, the terminal parses the first notification message to obtain the message type, then compares the message type with the prestored message type of the notification message that needs to be dynamically displayed, and may determine, according to a comparison result, that the first notification message needs to be dynamically displayed.

Manner 3: the message type of the first notification message is compared with a dynamically displayed notification message type list that is selected by the user, and it is determined that the first notification message needs to be dynamically displayed, where the dynamically displayed notification message type list is provided by the terminal for the user to select.

In the manner, the client sets a message type of a dynamically displayed notification message. For example, a Push server interface carries the message type of the first notification message. Before receiving a notification message, the terminal provides a dynamically displayed notification message type list for the user to select, and the terminal performs setting after the user makes selection. Then, when receiving the first notification message, the terminal parses the first notification message to obtain the message type, then compares the message type with the dynamically displayed notification message type list that is selected by the user, and if the message type belongs to the message type selected by the user, determines that the first notification message needs to be dynamically displayed.

In this embodiment of the present disclosure, the moving track may be, for example, free-fall, sliding down along a slope, and fluttering like leaves.

S105: Dynamically display the first notification message according to the icon and the moving track.

In this embodiment of the present disclosure, specifically, before S105, the method may further include the following.

S106: Receive an operation instruction of the user.

In this case, S105 is: when the operation instruction of the user meets a condition of dynamically displaying the first notification message, the first notification message is dynamically displayed according to the icon and the moving track.

If a home screen is enabled, the first notification message is dynamically displayed directly according to the icon and the moving track. If the home screen is not enabled, the terminal receives the operation instruction of the user, and when the operation instruction of the user meets a condition of dynamically displaying the first notification message, for example, an instruction of entering the home screen or shaking, the terminal dynamically displays the first notification message according to the icon and the moving track. For example, an icon dynamically falls from a notification bar according to a moving track, drops on a top part of the screen, and finally is displayed, and the user may tap the icon at any moment during fall of the icon to trigger a next action.

In the method for displaying a notification message provided by this embodiment of the present disclosure, a terminal receives a first notification message, parses the first notification message to obtain a message type of the first notification message or an application server identifier of the first notification message, acquires, according to the message type of the first notification message or the application server identifier of the first notification message, a moving track and an icon used to dynamically display the first notification message, and dynamically displays the first notification message according to the icon and the moving track. Therefore, attention of a user can be caught observably, the user is prompted to actively tap the icon to acquire content of the notification message, and the content of the notification message may not be displayed if the icon is not tapped. A position is not occupied and a screen is not blocked in a proper manner, and different tracks and different icons may be selected in different scenarios to implement different dynamic display processes. Therefore, the user can conveniently learn a real-time notification message in a timely manner, thereby improving service quality for the user.

In another embodiment of the present disclosure, that the terminal acquires, according to the message type of the first notification message or the application server identifier of the first notification message, the moving track used to dynamically display the first notification message, may specifically be implemented by the following four methods.

Method 1: the moving track used to dynamically display the first notification message is acquired according to the message type of the first notification message and a prestored correspondence between a notification message type and a moving track. In this case, it is merely necessary for a Push server interface to carry a notification message type. The terminal prestores the correspondence between a notification message type and a moving track. After receiving a notification message, the terminal may automatically adapt a corresponding moving track according to the notification message type obtained by parsing the first notification message. As shown in Table 1:

TABLE 1

| Notification message type | Moving track |
| --- | --- |
| Promotional information | Free-fall |
| Questionnaire | Fluttering like leaves |
| System upgrade | Sliding down along a slope |

Method 2: the moving track used to dynamically display the first notification message is acquired according to the application server identifier of the first notification message and a prestored correspondence between an application server and a moving track. The application server identifier may uniquely identify a merchant/an application, and the terminal prestores a correspondence between a merchant/an application and a moving track. Because a Push server interface carries an application server identifier that uniquely identifies a merchant/an application, the terminal may automatically adapt a corresponding moving track according to the application server identifier obtained by parsing the first notification message and the stored correspondence between a merchant/an application and a moving track. As shown in Table 2:

TABLE 2

| Merchant/application | Moving track |
| --- | --- |
| McDonald's | Free-fall |
| KFC | Fluttering like leaves |
| Traffic Rule Violation Check | Sliding down along a slope |

Method 3: if the first notification message carries an identifier of the moving track, the moving track used to dynamically display the first notification message is obtained according to the identifier of the moving track.

The identifier of the moving track is obtained by parsing the first notification message, so that the moving track used to dynamically display the first notification message can be obtained according to the identifier of the moving track.

Method 4: before the first notification message sent by a server is received, moving tracks used to dynamically display notification messages with different message types are set, or moving tracks used to dynamically display notification messages that are sent by different application servers are set. In this case, according to selection of the user, the terminal may set a same moving track or different moving tracks for the notification messages with different message types, or set a same moving track or different moving tracks for the notification messages that are sent by all merchants/applications.

It should be noted herein that, in a case in which neither the server nor the terminal designates a moving track, a system default moving track may be used, or one moving track is selected randomly from at least two moving tracks as the moving track of the notification message.

The icon may be, for example, an icon of a merchant, and an icon of an application itself. That the terminal acquires, according to the message type of the first notification message or the application server identifier of the first notification message, the icon used to dynamically display the first notification message may be implemented by the following four methods according to this embodiment of the present disclosure.

Figure 10:
FIG. 10 is a corresponding schematic between a merchant/an application and an icon, in Embodiment 1 of the method for displaying a notification message according to the present disclosure.
Figure 10:
Figure 10:

Method 1: the icon used to dynamically display the first notification message is acquired according to the message type of the first notification message and a prestored correspondence between a notification message type and an icon. In this case, it is merely necessary for a Push server interface to carry a notification message type. The terminal prestores the correspondence between a notification message type and an icon. After receiving a notification message, the terminal may automatically adapt a corresponding icon according to the notification message type obtained by parsing the first notification message. As shown in Table 3, Table 3 is illustrating in FIG. 10.

Method 2: the icon used to dynamically display the first notification message is acquired according to the application server identifier of the first notification message and a prestored correspondence between an application server and an icon. The application server identifier may uniquely identify a merchant/an application. The terminal prestores a correspondence between a merchant/an application and an icon. Because a Push server interface carries an application server identifier that uniquely identifies a merchant/an application, the terminal may automatically adapt a corresponding icon according to the application server identifier obtained by parsing the first notification message and the stored correspondence between a merchant/an application and an icon. As shown in Table 4, Table 4 is illustrating in FIG. 10.

Method 3: if the first notification message carries an identifier of the icon, the icon used to dynamically display the first notification message is obtained according to the identifier of the icon.

The identifier of the icon is obtained by parsing the first notification message, so that the icon used to dynamically display the first notification message may be obtained according to the identifier of the icon.

Method 4: before the first notification message is received, icons used to dynamically display notification messages with different message types are set, or icons used to dynamically display notification messages that are sent by different application servers are set. In this case, according to selection of the user, the terminal may set a same icon or different icons for all notification messages with different message types, or set a same icon or different icons for the notification messages that are sent by all merchants/applications.

In the following, two specific embodiments are used to describe in detail the technical solutions of the method embodiment shown in FIG. 1.

Figure 2:
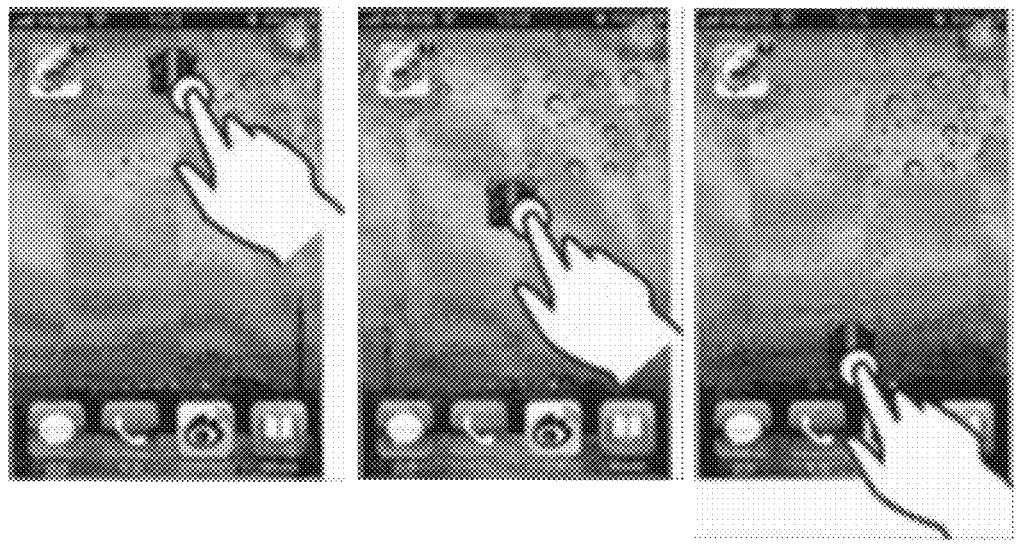
FIG. 2 is an effect drawing of dynamically displaying a notification message in Embodiment 2 of a method for displaying a notification message according to the present disclosure.
Figure 3:
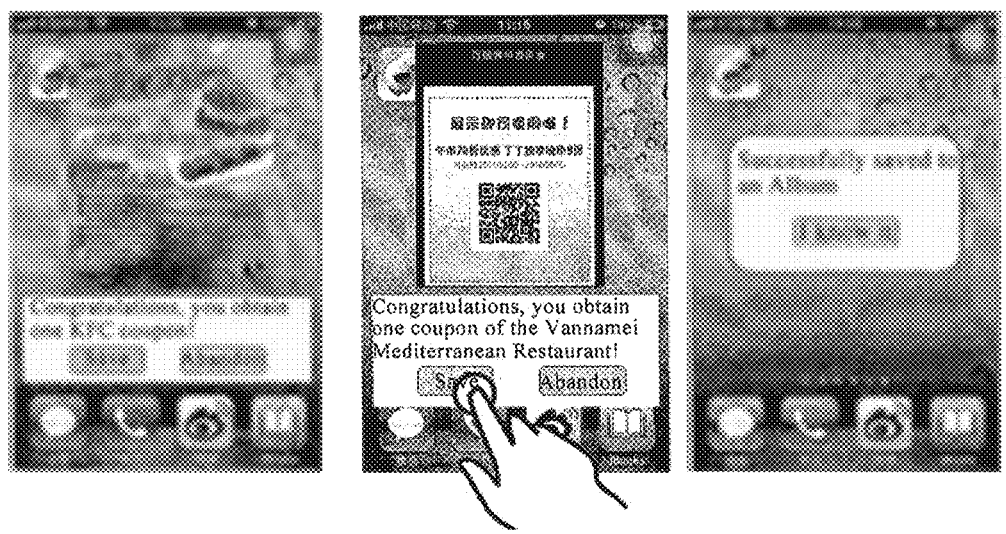
FIG. 3 is an effect drawing of dynamically displaying a notification message in Embodiment 2 of the method for displaying a notification message according to the present disclosure.
Figure 11:
FIG. 11 is a corresponding schematic between an identifier and an icon, in Embodiment 2 of the method for displaying a notification message according to the present disclosure.
Figure 11:
Figure 11:
Figure 11:

FIG. 2 is an effect drawing of dynamically displaying a notification message in Embodiment 2 of a method for displaying a notification message according to the present disclosure, and FIG. 3 is an effect drawing of dynamically displaying a notification message in Embodiment 2 of the method for displaying a notification message according to the present disclosure. In the method for displaying a notification message according to Embodiment 2 of the present disclosure, for example, a moving track and an icon used to dynamically display a notification message are acquired according to a message type of the notification message, a prestored correspondence between a notification message type and a moving track, and a prestored correspondence between a notification message type and an icon. A Push server interface carries a notification message type and a dynamic display identifier. When receiving a notification message, a client parses the notification message to obtain a message type and a dynamic display identifier. If the identifier is that the notification message needs to be dynamically displayed, the client determines the icon and the moving track used to dynamically display the notification message according to the stored correspondences and the message type obtained by parsing the notification message. The following Table 5 to Table 7 are data dictionaries corresponding to message types, moving tracks, and icons. Table 8 is a correspondence between the message types and moving tracks and icons. That is, it can be obtained with reference to Table 5 to Table 8 that, "promotional information" uses a dynamic display manner of "free-fall," and a display icon thereof is a "gift box." Table 7 is illustrating in FIG. 11.

TABLE 5

| Identifier | Message type |
| --- | --- |
| 001 | Promotional information |
| 002 | Questionnaire |
| 003 | System upgrade |
| 004 | Real-time message |

TABLE 6

| Identifier | Moving track |
| --- | --- |
| 001 | Free-fall |
| 002 | Sliding down along a slope |
| 003 | Fluttering like leaves |
| 004 | Random |

TABLE 8

| Message type identifier | Moving track identifier | Icon identifier |
| --- | --- | --- |
| 001 | 001 | 001 |
| 002 | 002 | 002 |
| 003 | 003 | 003 |
| 004 | 004 | 004 |

Further, when a terminal user operates on an interface of a "home screen," a received notification message with the type of "promotional information" may dynamically fall from a notification bar in a manner of "gift box" and "free-fall," and a dynamic display effect thereof is shown in FIG. 2. During fall of the "gift box," the terminal waits to receive a user instruction. When capturing that the user taps the gift box, the terminal may open the gift box, which pops up content of the notification message, for example, a "coupon," and prompts the user to perform a further operation of, for example, abandoning the "coupon," or saving the "coupon" to a third party application such as an Album or a Passbook. The implementation effect drawing of opening the gift box to display the coupon is shown in FIG. 3.

Figure 4:
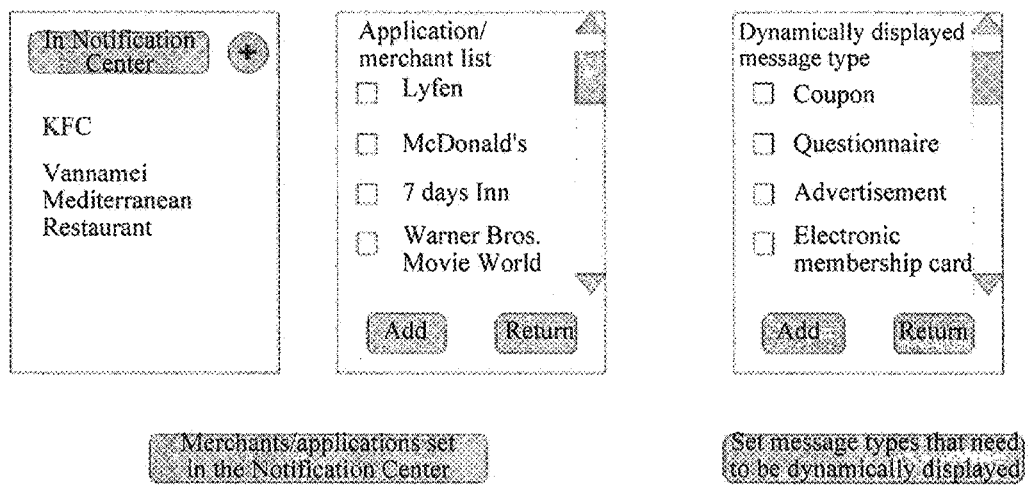
FIG. 4 is an implementation effect drawing of setting, by a terminal and according to selection of a user, a type of a message that needs to be dynamically displayed, in Embodiment 3 of a method for displaying a notification message according to the present disclosure.
Figure 5:
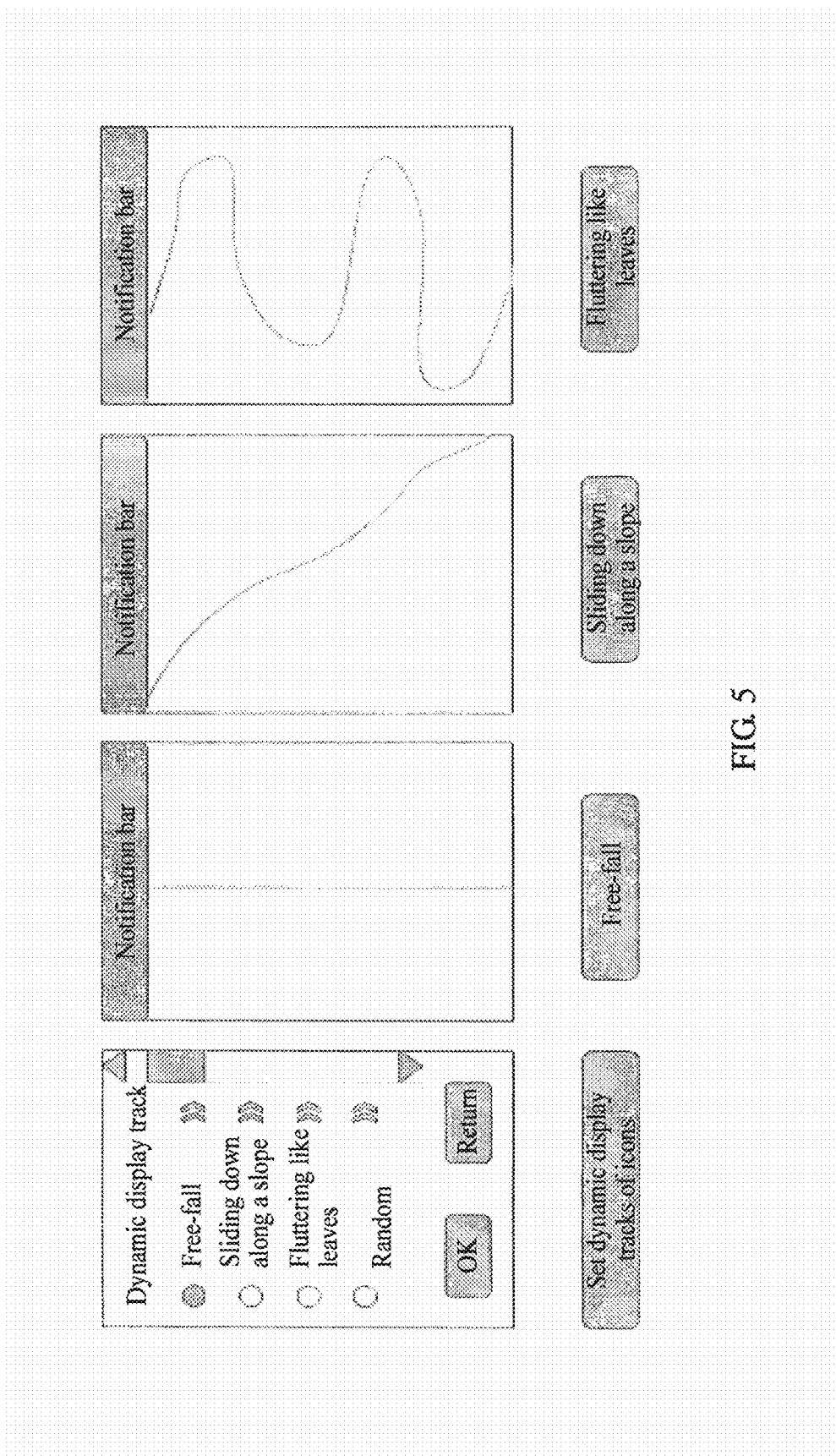
FIG. 5 is an implementation effect drawing of setting a moving track and an icon by a terminal and according to selection of a user, in Embodiment 3 of the method for displaying a notification message according to the present disclosure.

FIG. 4 is an implementation effect drawing of setting, by a terminal and according to selection of a user, a type of a message that needs to be dynamically displayed, in Embodiment 3 of a method for displaying a notification message according to the present disclosure, and FIG. 5 is an implementation effect drawing of setting a moving track and an icon by a terminal and according to selection of a user, in Embodiment 3 of the method for displaying a notification message according to the present disclosure. The method for displaying a notification message according to Embodiment 3 of the present disclosure is described by an example in which a terminal sets, according to selection of a user, a same icon or different icons for all notification message types, or sets a same icon or different icons for notification messages that are sent by all merchants/applications. With reference to FIG. 4 and FIG. 5, the method of this embodiment of the present disclosure includes the following.

S40: The terminal sets merchants/applications whose notification messages are to be received by the terminal, types and dynamic display icons of the to-be-received notification messages (optionally, if the icons are not set, a system default icon is used), and tracks formed when the icons fall from a notification bar (optionally, if the tracks are not set, a system default track is used).

S41: If a merchant/an application is in a "notification list," when receiving a notification message, the terminal determines a type of the notification message. If the message type belongs to the message types to be received by the terminal, S42 is turned to, and otherwise, an existing notification display manner (dropping down the notification bar for display, or the like) is used.

S42: Extract an icon (notification messages with different types correspond to different icons) and a track formed when the icon falls from the notification bar (if the terminal does not set the track, a system default track is used).

S43: When the terminal receives an instruction that the user enters a home screen, the "icon" dynamically falls from the notification bar according to the "track," drops on a top part of the screen, and finally is displayed.

S44: When the terminal receives an instruction of tapping the icon, display content (an electronic coupon, a questionnaire, or the like) of the notification message.

Figure 6:
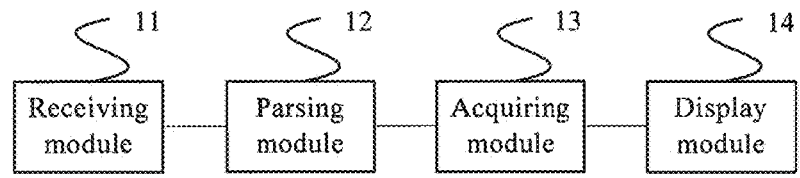
FIG. 6 is a schematic structural diagram of Embodiment 1 of an apparatus for displaying a notification message according to the present disclosure.

FIG. 6 is a schematic structural diagram of Embodiment 1 of an apparatus for displaying a notification message according to the present disclosure. As shown in FIG. 6, the apparatus in this embodiment of the present disclosure may include a receiving module 11, a parsing module 12, an acquiring module 13, and a display module 14, where the receiving module 11 is configured to receive a first notification message. The parsing module 12 is configured to parse the first notification message to obtain a message type of the first notification message or an application server identifier of the first notification message. The acquiring module 13 is configured to acquire, according to the message type of the first notification message or the application server identifier of the first notification message, a moving track used to dynamically display the first notification message and an icon used to dynamically display the first notification message. The display module 14 is configured to dynamically display the first notification message according to the icon and the moving track.

Further, the receiving module 11 is configured to receive an operation instruction of a user, and the display module 14 is configured to, when the operation instruction of the user meets a condition of dynamically displaying the first notification message, dynamically display the first notification message according to the icon and the moving track.

The apparatus of this embodiment may be configured to execute the technical solutions of the method embodiment shown in FIG. 1, implementation principles thereof are similar, and details are not described herein again.

In the apparatus for displaying a notification message provided by this embodiment of the present disclosure, a receiving module receives a first notification message, and a parsing module parses the first notification message to obtain a message type of the first notification message or an application server identifier of the first notification message. An acquiring module acquires, according to the message type of the first notification message or the application server identifier of the first notification message, a moving track and an icon used to dynamically display the first notification message. A display module dynamically displays the first notification message according to the icon and the moving track. Therefore, attention of a user can be caught observably, the user is prompted to actively tap the icon to acquire content of the notification message, and the content of the notification message may not be displayed if the icon is not tapped. A position is not occupied and a screen is not blocked in a proper manner, and different tracks and different icons may be selected in different scenarios to implement different dynamic display processes. Therefore, the user can conveniently learn a real-time notification message in a timely manner, thereby improving service quality for the user.

Figure 7:
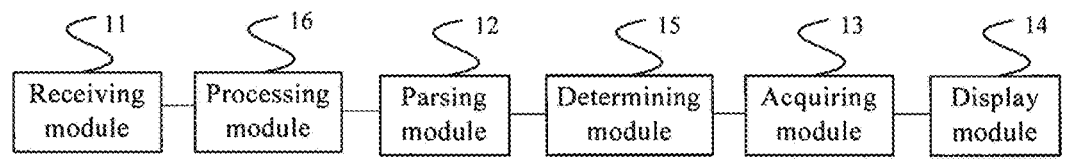
FIG. 7 is a schematic structural diagram of Embodiment 2 of an apparatus for displaying a notification message according to the present disclosure.

FIG. 7 is a schematic structural diagram of Embodiment 2 of an apparatus for displaying a notification message according to the present disclosure. As shown in FIG. 7, based on the structure of the apparatus shown in FIG. 6, the apparatus in this embodiment of the present disclosure may further include a processing module 16 and a determining module 15. The receiving module 11 is further configured to, before receiving the first notification message, receive an instruction, which is sent by the user, of enabling a notification message dynamic display function. The processing module 16 is configured to enable the dynamic display function according to the instruction, which is sent by the user, of enabling the notification message dynamic display function.

In another embodiment of the present disclosure, the determining module 15 is further configured to, before the acquiring module 13 acquires, according to the message type of the first notification message or the application server identifier of the first notification message, the moving track and the icon used to dynamically display the first notification message, determine, according to the message type of the first notification message, that the first notification message needs to be dynamically displayed.

In another embodiment of the present disclosure, the determining module 15 is configured to, if the first notification message carries a dynamic display identifier, determine, according to the identifier, that the first notification message needs to be dynamically displayed; or determine, according to the message type of the first notification message and a prestored message type of a notification message that needs to be dynamically displayed, that the first notification message needs to be dynamically displayed, or compare the message type of the first notification message with a dynamically displayed notification message type list that is selected by the user, and determine that the first notification message needs to be dynamically displayed.

In another embodiment of the present disclosure, the acquiring module 13 is configured to acquire, according to the message type of the first notification message and a prestored correspondence between a notification message type and a moving track, the moving track used to dynamically display the first notification message, or acquire, according to the application server identifier of the first notification message and a prestored correspondence between an application server and a moving track, the moving track used to dynamically display the first notification message, or, if the first notification message carries an identifier of the moving track, obtain, according to the identifier of the moving track, the moving track used to dynamically display the first notification message, or, before the first notification message sent by a server is received, set moving tracks used to dynamically display notification messages with different message types, or set moving tracks used to dynamically display notification messages that are sent by different application servers.

In another embodiment of the present disclosure, the acquiring module 13 is further configured to acquire, according to the message type of the first notification message and a prestored correspondence between a notification message type and an icon, the icon used to dynamically display the first notification message, or acquire, according to the application server identifier of the first notification message and a prestored correspondence between an application server and an icon, the icon used to dynamically display the first notification message, or, if the first notification message carries an identifier of the icon, obtain, according to the identifier of the icon, the icon used to dynamically display the first notification message, or, before the first notification message is received, set icons used to dynamically display notification messages with different message types, or set icons used to dynamically display notification messages that are sent by different application servers.

The apparatus of this embodiment may be configured to execute the technical solutions of the method embodiment shown in FIG. 1, implementation principles thereof are similar, and details are not described herein again.

Figure 8:
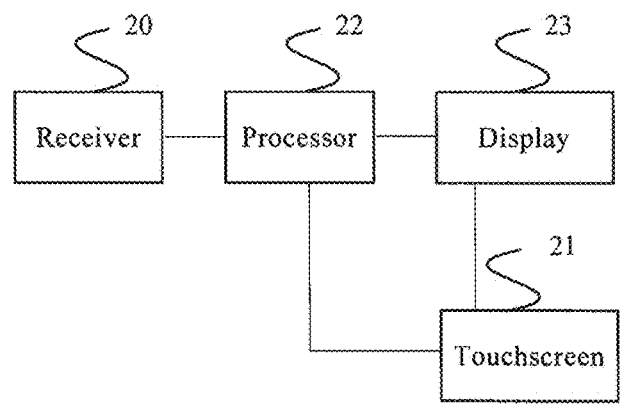
FIG. 8 is a schematic structural diagram of Embodiment 3 of an apparatus for displaying a notification message according to the present disclosure.
Figure 9:
FIG. 9 is a corresponding schematic between a notification message type and an icon, in Embodiment 1 of the method for displaying a notification message according to the present disclosure.
Figure 9:
Figure 9:

FIG. 8 is a schematic structural diagram of Embodiment 3 of an apparatus for displaying a notification message according to the present disclosure. As shown in FIG. 8, the apparatus in this embodiment of the present disclosure may include a receiver 20, a touchscreen 21, a processor 22, and a display 23. The receiver 20 is configured to receive a first notification message. The processor 22 is configured to parse the first notification message to obtain a message type of the first notification message or an application server identifier of the first notification message, and acquire, according to the message type of the first notification message or the application server identifier of the first notification message, a moving track used to dynamically display the first notification message and an icon used to dynamically display the first notification message. The display 23 is configured to dynamically display the first notification message according to the icon and the moving track. The touchscreen 21 is configured to receive a user input. For example, the receiver 20 receives the first notification message, after the display 23 dynamically displays the first notification message, a user taps an icon displayed by the display, and the touchscreen receives a user input.

In another embodiment of the present disclosure, the touchscreen 21 is further configured to receive an operation instruction of the user, and the display 23 is configured to, when the operation instruction of the user meets a condition of dynamically displaying the first notification message, dynamically display the first notification message according to the icon and the moving track.

In another embodiment of the present disclosure, the touchscreen 21 is further configured to, before the receiver 20 receives the first notification message, receive a user instruction, where the user instruction is used to enable a notification message dynamic display function.

The apparatus in this embodiment of the present disclosure may be configured to execute the technical solutions of the method embodiment shown in FIG. 1, implementation principles thereof are similar, and details are not described herein again.

In the apparatus for displaying a notification message provided by this embodiment of the present disclosure, a receiver receives a first notification message. A processor parses the first notification message to obtain a message type of the first notification message or an application server identifier of the first notification message, and acquires, according to the message type of the first notification message or the application server identifier of the first notification message, a moving track and an icon used to dynamically display the first notification message. A display dynamically displays the first notification message according to the icon and the moving track. A touchscreen receives a user input. Therefore, attention of a user can be caught observably, the user is prompted to actively tap the icon to acquire content of the notification message, and the content of the notification message may not be displayed if the icon is not tapped. A position is not occupied and a screen is not blocked in a proper manner, and different tracks and different icons may be selected in different scenarios to implement different dynamic display processes. Therefore, the user can conveniently learn a real-time notification message in a timely manner, thereby improving service quality for the user.

In an apparatus for displaying a notification message according to Embodiment 4 of the present disclosure, the processor 22 is further configured to, before acquiring, according to the message type of the first notification message or the application server identifier of the first notification message, the moving track and the icon used to dynamically display the first notification message, determine, according to the message type of the first notification message, that the first notification message needs to be dynamically displayed.

In another embodiment of the present disclosure, the processor 22 is configured to, if the first notification message carries a dynamic display identifier, determine, according to the identifier, that the first notification message needs to be dynamically displayed, or determine, according to the message type of the first notification message and a prestored message type of a notification message that needs to be dynamically displayed, that the first notification message needs to be dynamically displayed, or compare the message type of the first notification message with a dynamically displayed notification message type list that is selected by the user, and determine that the first notification message needs to be dynamically displayed.

In another embodiment of the present disclosure, the processor 22 is configured to acquire, according to the message type of the first notification message and a prestored correspondence between a notification message type and a moving track, the moving track used to dynamically display the first notification message; or acquire, according to the application server identifier of the first notification message and a prestored correspondence between an application server and a moving track, the moving track used to dynamically display the first notification message, or, if the first notification message carries an identifier of the moving track, obtain, according to the identifier of the moving track, the moving track used to dynamically display the first notification message, or, before the first notification message sent by a server is received, set moving tracks used to dynamically display notification messages with different message types, or set moving tracks used to dynamically display notification messages that are sent by different application servers, and acquire, according to the message type of the first notification message and a prestored correspondence between a notification message type and an icon, the icon used to dynamically display the first notification message, or acquire, according to the application server identifier of the first notification message and a prestored correspondence between an application server and an icon, the icon used to dynamically display the first notification message, or, if the first notification message carries an identifier of the icon, obtain, according to the identifier of the icon, the icon used to dynamically display the first notification message, or, before the first notification message is received, set icons used to dynamically display notification messages with different message types, or set icons used to dynamically display notification messages that are sent by different application servers.

The apparatus of this embodiment may be configured to execute the technical solutions of the method embodiment shown in FIG. 1, implementation principles thereof are similar, and details are not described herein again.

In the several embodiments provided by the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for displaying a notification message by a terminal that includes a receiver coupled to a processor, a display coupled to the processor, and a touchscreen coupled to the display and to the processor, the method comprising:
   receiving an instruction initialed by a user to enable a notification message dynamic display function;
   responsive to the instruction, enabling, by the processor, the notification message dynamic display function;
   receiving, by the receiver, a notification message;
   parsing, by the processor, the notification message to obtain a message type of the notification message or an application server identifier of the notification message;
   determining, according to the message type, that the notification message is to be dynamically displayed comprises:
   comparing the message type of the notification message with a dynamically displayed notification message type list that is selected by a user, and
   determining that the notification message is to be dynamically displayed based on the comparing, wherein the dynamically displayed notification message type list is provided by the terminal for the user to select;
   acquiring, by the processor and according to the message type of the notification message or the application server identifier of the notification message, a selected moving track of a plurality of moving tracks and a selected icon of a plurality of icons corresponding to the notification message, wherein the selected moving track corresponds to a path along which the selected icon of the plurality of icons will move on the display;
   dynamically displaying, by the display, the notification message based on the selected icon of the plurality of icons and the selected moving track of the plurality of moving tracks by causing the selected icon of the plurality of icons to fall from a notification bar at a top of the display according to the selected moving track of the plurality of moving tracks;
   receiving user input via the selected icon of the plurality of icons; and
   displaying, in response to the user input, an interface to prompt a next action.

2. The method of claim 1, wherein before
   dynamically displaying, by the display, the notification message based on the selected icon of the plurality of icons and the selected moving track of the plurality of moving tracks, the method further comprises receiving an operation instruction from a user, and wherein dynamically displaying the notification message includes dynamically displaying the selected icon of the plurality of icons based on the selected moving track of the plurality of moving tracks when the operation instruction meets a condition.

3. The method of claim 1, wherein determining that the notification message is to be dynamically displayed further comprises determining, according to a dynamic display identifier, that the notification message is to be dynamically displayed when the notification message carries the dynamic display identifier.

4. The method of claim 1, wherein determining that the notification message is to be dynamically displayed further comprises determining, according to the message type of the notification message and a prestored message type of a notification message that needs to be dynamically displayed, that the notification message needs to be dynamically displayed.

5. The method of claim 1, wherein acquiring the selected moving track comprises one of:
   acquiring, based on the message type and a first prestored correspondence between a notification message type and the selected moving track of the plurality of moving tracks corresponds to a falling fluttering leaf track;
   acquiring the selected moving track of the plurality of moving tracks based on the application server identifier of the notification message and a second prestored correspondence between an application server and the selected moving track of the plurality of moving tracks;
   obtaining the selected moving track of the plurality of moving tracks based on an identifier of the selected moving track when the notification message carries the identifier of the selected moving track of the plurality of moving tracks;
   setting the plurality of moving tracks corresponding to each of a plurality of notification messages with a different message type before receiving the notification message from an application server; or
   setting the plurality of moving tracks corresponding to each of a plurality of display notification messages from different application servers.

6. The method of claim 5, wherein acquiring the selected icon of the plurality of icons comprises one of:
   acquiring the selected icon of the plurality of icons based on the message type of the notification message and the first prestored correspondence between a notification message type and the selected icon of the plurality of icons;
   acquiring the selected icon of the plurality of icons based on the application server identifier of the notification message and the second prestored correspondence between the application server and the selected icon of the plurality of icons;
   obtaining the selected icon of the plurality of icons based on an identifier of the selected icon of the plurality of icons when the notification message carries the identifier of the selected icon of the plurality of icons;
   setting the plurality of icons corresponding to the each of the plurality of notification messages with the different message type before receiving the notification message; or
   setting the plurality of icons corresponding to notification messages from different application servers.

7. The method of claim 1, wherein each selected icon of the plurality of icons is selected based on a different message type of a plurality of message types.

8. The method of claim 7, wherein the selected icon of the plurality of icons is a first selected icon that corresponds to a first message type of the plurality of different message types, and a second selected icon of the plurality of icons corresponds to a second message type of the plurality of message types.

9. An apparatus for displaying a notification message, comprising:

a receiver configured to:
receive an instruction from a user to enable a notification message dynamic display function; and
receive a notification message;
a display;
a touchscreen coupled to the display; and
a processor coupled to the receiver, the display, and the touchscreen and configured to:
enable the notification message dynamic display function responsive to the instruction;
parse the notification message to obtain a message type of the notification message or an application server identifier of the notification message;
determine, according to the message type, that the notification message is to be dynamically displayed comprises:
compare the message type of the notification message with a dynamically displayed notification message type list that is selected by a user, and
determine that the notification message is to be dynamically displayed based on the compare, wherein the dynamically displayed notification message type list is provided by the apparatus for the user to select;
acquire, according to the message type of the notification message or the application server identifier of the notification message, a selected moving track of a plurality of moving tracks and a selected icon of a plurality of icons corresponding to the notification message;
cause the display to dynamically display the notification messaged based on the selected icon of the plurality of icons and the selected moving track of the plurality of moving tracks, wherein the dynamically displaying the notification message causes the selected icon of the plurality of icons to fall from a notification bar according to the selected moving track of the plurality of moving tracks;
receive user input via the selected icon of the plurality of icons; and
display, in response to the user input an interface to prompt a next action.

10. The apparatus of claim 9, wherein the receiver is further configured to receive an operation instruction from a user, and wherein the display is configured to, when the operation instruction meets a condition of
dynamically displaying the notification message, dynamically display the selected icon of the plurality of icons according to the selected moving track of the plurality of moving tracks.

11. The apparatus of claim 9, wherein the processor is further configured to determine, according to a dynamic display identifier, that the notification message is to be dynamically displayed when the notification message carries the dynamic display identifier.

12. The apparatus of claim 9, wherein the processor is further configured to determine, according to the message type of the notification message and a prestored message type of a notification message that needs to be dynamically displayed, that the notification message needs to be dynamically displayed.

13. The apparatus of claim 9, wherein the processor is further configured to acquire the selected moving track of the plurality of moving tracks by one of:
acquiring the message type of the notification message and a first prestored correspondence between a notification message type and the selected moving track of the plurality of moving tracks;
acquiring the application server identifier of the notification message and a second prestored correspondence between an application server and the selected moving track;
obtaining an identifier of the moving track of the plurality of moving tracks when the notification message carries the identifier of the moving track of the plurality of moving tracks;
before receiving the notification message from a server, setting the plurality of moving tracks used to dynamically display the plurality of icons corresponding to each of a plurality of notification messages with a different message type; or
setting the plurality of moving tracks used to dynamically display the plurality of icons corresponding to each of a plurality of notification messages from different application servers.

14. The apparatus of claim 13, wherein the processor is further configured to acquire the icon of the plurality of icons by one of:
acquiring the message type of the notification message and the first prestored correspondence between a notification message type and the selected icon of the plurality of icons;
acquiring the selected icon of the plurality of icons based on the application server identifier of the first notification message and the second prestored correspondence between the application server and the icon of the plurality of icons;
obtaining the selected icon of the plurality of icons based on an identifier of the icon of the plurality of icons when the first notification message carries the identifier of the selected icon of the plurality of icons;
setting the plurality of icons corresponding to notification messages with the different message type before receiving the notification message; or
setting the plurality of icons corresponding to display notification messages from different application servers.

* * * * *